United States Patent
Eichenbaum

(12) 
(10) Patent No.: US 6,252,719 B1
(45) Date of Patent: Jun. 26, 2001

(54) BEAM SPLITTER/COMBINER MODULE

(75) Inventor: Bernard Raymond Eichenbaum, Basking Ridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/272,494

(22) Filed: Mar. 19, 1999

(51) Int. Cl.[7] ............................. G02B 27/14; H04J 14/02
(52) U.S. Cl. ............................................. 359/634; 359/129
(58) Field of Search ................................. 359/637, 628, 359/629, 634, 124, 127, 129; 385/24

(56) References Cited

U.S. PATENT DOCUMENTS

| | | | |
|---|---|---|---|
| 4,431,258 | 2/1984 | Fye | 350/1.6 |
| 5,048,946 | * 9/1991 | Sklar et al. | 351/206 |
| 5,052,780 | 10/1991 | Klein | 359/638 |
| 5,210,643 | 5/1993 | Fujii et al. | 359/638 |
| 5,521,733 | * 5/1996 | Akiyama et al. | 359/127 |
| 5,600,487 | * 2/1997 | Klyomoto et al. | 359/634 |
| 5,912,910 | * 6/1999 | Sanders et al. | 372/22 |
| 5,933,260 | * 8/1999 | Cao et al. | 359/124 |
| 5,963,684 | * 10/1999 | Ford et al. | 385/24 |
| 6,034,378 | * 3/2000 | Shiraishi | 250/559.29 |
| 6,041,072 | * 3/2000 | Ventrudo et al. | 372/102 |

* cited by examiner

*Primary Examiner*—Georgia Epps
*Assistant Examiner*—Saeed Seyrafi

(57) ABSTRACT

A beam splitter/combiner module for multiplexing and/or demultiplexing a plurality of optical signals having at least three different wavelengths $\lambda_1$, $\lambda_2$, and $\lambda_3$ traveling through the module. The module includes a first dichroic mirror having low loss transmission over a first preselected range of wavelengths including $\lambda_1$ and $\lambda_2$ so as to substantially transmit signals having wavelengths $\lambda_1$ and $\lambda_2$ through the first mirror and along an optical signal path of the module. The first dichroic mirror also has high reflectance over a second preselected range of wavelengths including $\lambda_3$ so as to substantially reflect from the first mirror signals having wavelength $\lambda_3$. A second dichroic mirror, disposed along the optical signal path for receiving from the first mirror the signals transmitted through the first mirror, has low loss transmission over a third preselected range of wavelengths including $\lambda_1$ so as to substantially transmit signals having wavelength $\lambda_1$ through the second dichroic mirror. The second dichroic mirror also has high reflectance over a third preselected range of wavelengths including $\lambda_2$ so as to substantially reflect from the second mirror signals having wavelength $\lambda_2$.

27 Claims, 4 Drawing Sheets

BEAM SPLITTER/COMBINER MODULE

BACKGROUND OF THE INVENTION

1. Field of the Invention

The present invention relates to beam splitters and, in particular, to a beam splitter and/or combiner module for a wavelength division multiplex system.

2. Description of the Related Art

In optical fiber transmission systems, it is known to terminate a bidirectionally used optical fiber with what is commonly referred to as a BiDi module which provides an economical and space-conserving termination. The BiDi module, typically disposed at one end of an optical fiber, has a dichroic mirror oriented with respect to the fiber at about 45° incidence and coated to reflect either a 1.3 $\mu$m or 1.5 $\mu$m wavelength.

U.S. Pat. No. 4,431,258 to Fye discloses an optical transmission system having a beam splitter at opposite ends of an optical fiber. Each of the beam splitters has an isosceles right triangular cross section and a multilayer dielectric coating sandwiched therebetween. Each layer of the coating is tuned for quarter-wave operation with 45° incident light at 0.83 $\mu$m. A first beam splitter is oriented with respect to the fiber at 43° incidence and has a high nonpolarizing reflectance at a wavelength $\lambda_2$ of 0.85 $\mu$tm and a low loss transmission at a wavelength $\lambda_1$ of 0.81 $\mu$m. A second beam splitter is oriented with respect to the fiber at 47° incidence and has a high nonpolarizing reflectance at the wavelength $\lambda_1$ and a low loss transmission at the wavelength $\lambda_2$. So arranged, the optical transmission system achieves full duplex communications at 0.81 $\mu$m and 0.85 $\mu$m over a single optical fiber.

U.S. Pat. No. 5,210,643 to Fujii et al. discloses a wave combining apparatus for semiconductor lasers. The combining apparatus includes a first dichroic mirror for combining two orthogonal P-polarized beams of 780 nm and 830 nm to produce a first resultant beam, and a second dichroic mirror for combining two orthogonal S-polarized beams of 780 nm and 830 nm to generate a second resultant beam. The first and second resultant beams are then combined by a polarizing beam splitter prism to form a single waveform for transmission through an optical fiber. According to Fujii et al., this wave combining apparatus is efficient because the dichroic mirrors can be selected to maximize transmission of the polarized beams.

U.S. Pat. No. 5,052,780 to Klein discloses a dichroic beam splitter for use with high power lasers. The beam splitter of Klien has a single uncoated piece of high quality optical glass which separates and rejects a fundamental beam while transmitting the harmonics therethrough.

SUMMARY OF THE INVENTION

A particular advantage of the present invention is that the inventive beam splitter/combiner module can be manufactured at low cost.

Another advantage of the present invention is that the beam splitter/combiner module can separate and/or combine a plurality of signals having more than three different wavelengths.

In a currently presently preferred embodiment of the present invention, the beam splitter/combiner module is connectable to an optical fiber end and is operative for multiplexing and/or demultiplexing a plurality of optical signals having at least three different to wavelengths $\lambda_1$, $\lambda_2$, and $\lambda_3$ traveling through the module. The inventive module includes a first dichroic mirror having a low loss transmission over a first preselected range of wavelengths including $\lambda_1$ and $\lambda_2$ so as to substantially transmit signals having wavelengths $\lambda_1$ and $\lambda_2$ therethrough and along an optical signal path. The first dichroic mirror also has a high reflectance over a second preselected range of wavelengths including 3 so as to substantially reflect a signal having wavelength $\lambda_3$. A second dichroic mirror, disposed along the optical signal path for receiving the signals transmitted through the first dichroic mirror, has a low loss transmission over a third preselected range of wavelengths including $\lambda_1$ so as to substantially transmit the signal at wavelength $\lambda_1$ through the second dichroic mirror. The second dichroic mirror also has a high reflectance over a fourth preselected range of wavelengths including $\lambda_2$ so as to substantially reflect the signal having wavelength $\lambda_2$.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
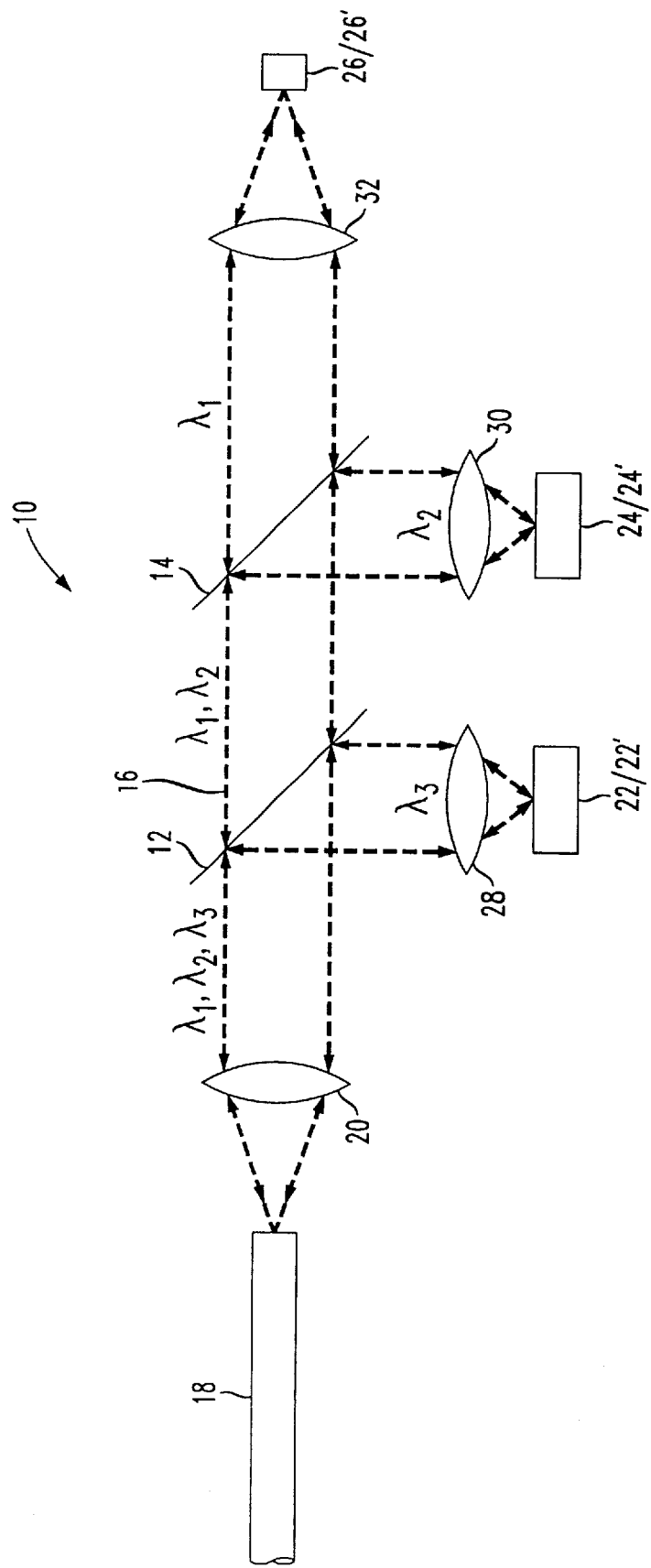
FIG. 1 schematically illustrates a beam splitter/combiner module constructed in accordance with one embodiment of the present invention.

Referring now to the drawings, FIG. 1 shows a preferred embodiment of a beam splitter/combiner module 10 constructed in accordance with the present invention for multiplexing and/or demultiplexing optical signals having three different wavelengths $\lambda_1$, $\lambda_2$ and $\lambda_3$. As will be readily apparent to a person of ordinary skill in the art from the disclosure herein, the inventive beam splitter/module can also operate on more than three wavelengths. As seen in FIG. 1, the module 10 includes a first dichroic mirror 12 and a second dichroic mirror 14 arranged in tandem along an optical signal path 16 for communicating optical signals along signal path 16 between the first and the second dichroic mirrors 14, 16. Each mirror 12, 14 is oriented at an angle relative to the optical signal path. Advantageously, the dichroic mirrors 12, 14 are constructed to separate one wavelength from a plurality of wavelengths by either reflecting a select wavelength while transmitting the remaining wavelengths or, alternatively, transmitting the select wavelength and reflecting the remaining wavelengths. As exemplarily shown in FIG. 1, the first dichroic mirror 12 is constructed to have low loss transmission at $\lambda_1$ and $\lambda_2$ and high reflectance at $\lambda_3$ such that the signals at $\lambda_1$ and $\lambda_2$ are substantially transmitted through the first dichroic mirror 12 and the signal $\lambda_3$ is substantially reflected therefrom.

Optionally, first dichroic mirror 12 permits a predetermined range of wavelengths to pass therethrough as such dichroic mirrors are less costly to produce than dichroic mirrors that absorb all but one specific wavelength. The second dichroic mirror 14 may likewise be constructed to have low loss transmission at wavelength $\lambda_1$, or optionally over a preselected range of wavelengths including $\lambda_1$, and high reflectance at wavelength $\lambda_2$. Although only two dichroic mirrors are shown, it is contemplated that the beam splitter/combiner module 10 may include additional dichroic mirrors interposed between the first and second dichroic mirrors shown in FIG. 1.

The dichroic mirrors 12, 14 may be implemented by a dichroic glass with dielectric coatings formed thereon to selectively reflect a specific wavelength or a preselected range of wavelengths at an incident angle of, for example, about 45°. The dielectric coatings may, in one embodiment, consist of alternating layers of quarter-wave film having a higher refractive index and a lower refractive index, respectively, relative to that of the dichroic glass. Depending on the intended application, the dichroic glass may be constructed as a narrowband filter for transmitting a specific wavelength, a broadband filter for transmitting a predetermined range of wavelengths, or a fine-tooth-comb type filter for transmitting a plurality of predefined wavelengths.

Preferably, the first dichroic mirror 12 is oriented so that the reflected signal is at about 45° incidence to the reflecting surface of the first dichroic mirror 12. The second dichroic mirror 14 is substantially parallel to the first dichroic mirror 12.

As shown in FIG. 1, the module 10 is generally intended for placement at an input/output end of an optical fiber 18 or otherwise for operative connection to the fiber and may include a collimating lens 20 disposed between the input/output end of the optical fiber 18 and the first dichroic mirror 12. The lens 20 collimates the optical signals emitted from the optical fiber end and converges the optical signals propagating from the first dichroic mirror 12 and onto the optical fiber end. A first detector 22 is disposed at a distance from the optical signal path 16 and is oriented to receive the signal that reflects from the coatings of the first dichroic mirror 12. Alternatively, a first signal source 22' may be substituted for the first detector 22 for emitting a signal at wavelength 3 to the first dichroic mirror 12 for reflection by mirror 12 into the optical fiber end. Similarly, a second source 24' is provided at a distance from the optical signal path 16 for emitting a signal at wavelength $\lambda_2$ onto the second dichroic mirror or, alternatively, a second detector 24 may be positioned at that location for receiving the signal reflected by the second dichroic mirror 14. A third source 26' or detector 26 is positioned along the optical path for emitting a signal at wavelength $\lambda_1$ onto and through second dichoric mirror or for receiving the signal transmitted through second dichroic mirror 14. Collimating lenses 28, 30, 32 may be positioned between each detector or source 22, 24, 26 or 22', 24', 26' and its respective dichroic io mirror 12, 14 for collimating and converging the signals that travel therebetween. It is apparent from the above disclosure that any combination of sources and detectors may also be provided depending on the intended application.

It is contemplated that instead of a source or a detector, an optical transceiver may be employed at each of the positions 22, 24, 26. It is further intended that the module 10 will operate on signals from either a singlemode fiber or a multimode fiber.

Figure 2:
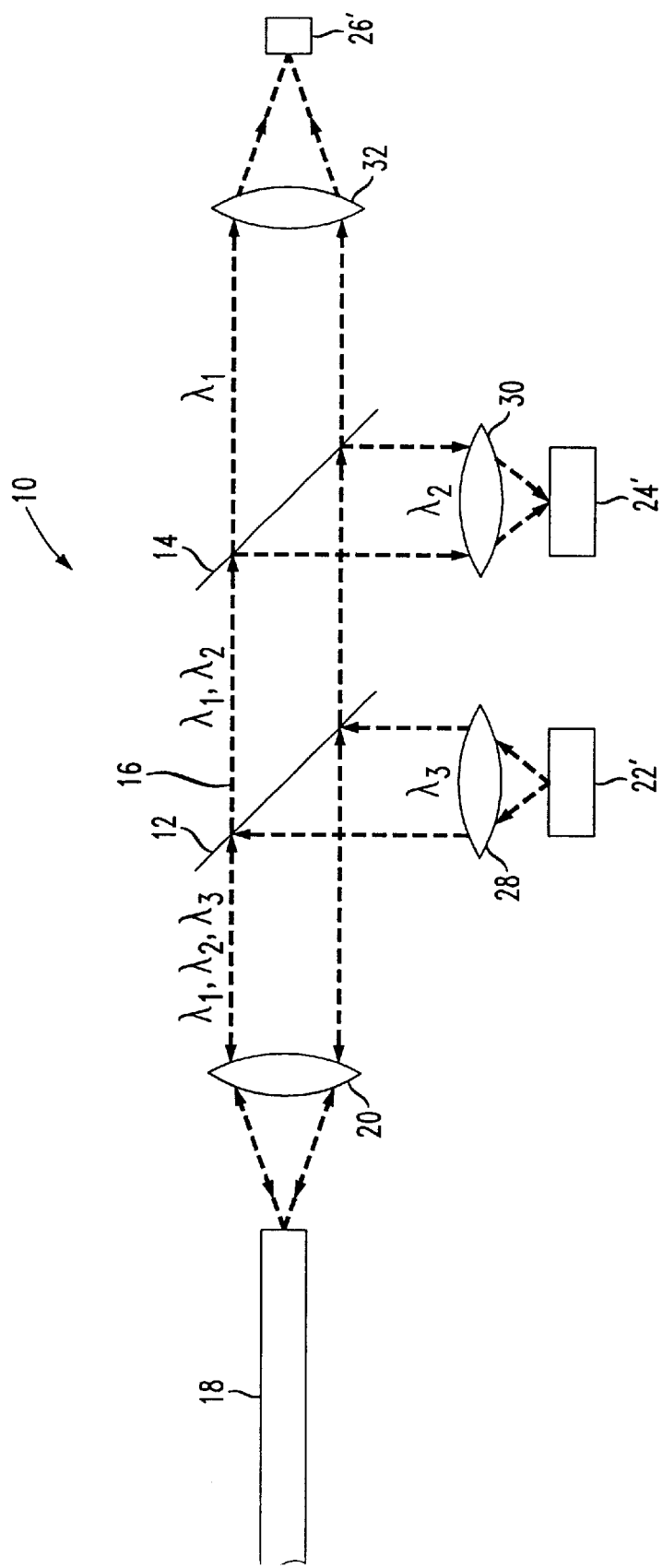
FIG. 2 shows another embodiment of a beam splitter/combiner module of the present invention.

Thus, it will be readily appreciated that the inventive module 10 may be configured as a combiner and/or a splitter for use in a bidirectional transmission system wherein optical signals may propagate concurrently in opposite directions on and along an optical fiber. For illustrative purposes, FIG. 2 depicts an optical fiber end which emits a combined beam having wavelengths at 1440 nm ($\lambda_2$) and 1550 nm ($\lambda_1$). Also shown in FIG. 2 is the inventive beam splitter/combiner module 10 including a source 22' for emitting a signal at 1310 nm ($\lambda_3$), and detectors 24', 26' for sensing optical signals. The first dichroic mirror has low loss transmission in the wavelength region 1335–1600 nm and high reflectance at 1310 nm ($\lambda_3$); the second dichroic mirror has low loss transmission for wavelengths greater than 1500 nm and high reflectance at 1440 nm ($\lambda_2$). As so arranged, the 1550 nm ($\lambda_1$) wavelength emitted from the optical fiber end is collimated by lens 20, travels through the first and second dichroic mirrors 12, 14 and is converged by lens 32 onto detector 26'. The 1440 nm ($\lambda_2$) wavelength, on the other hand, is collimated by collimating lens 20 and propagates through the first dichroic mirror 12, but is reflected by the second dichroic mirror 14 and sensed by detector 24'. The 1310 nm ($\lambda_1$) wavelength radiates from the source 22' is reflected by the first dichroic mirror 12, and is converged by lens 20 onto the optical fiber end.

Figure 3:
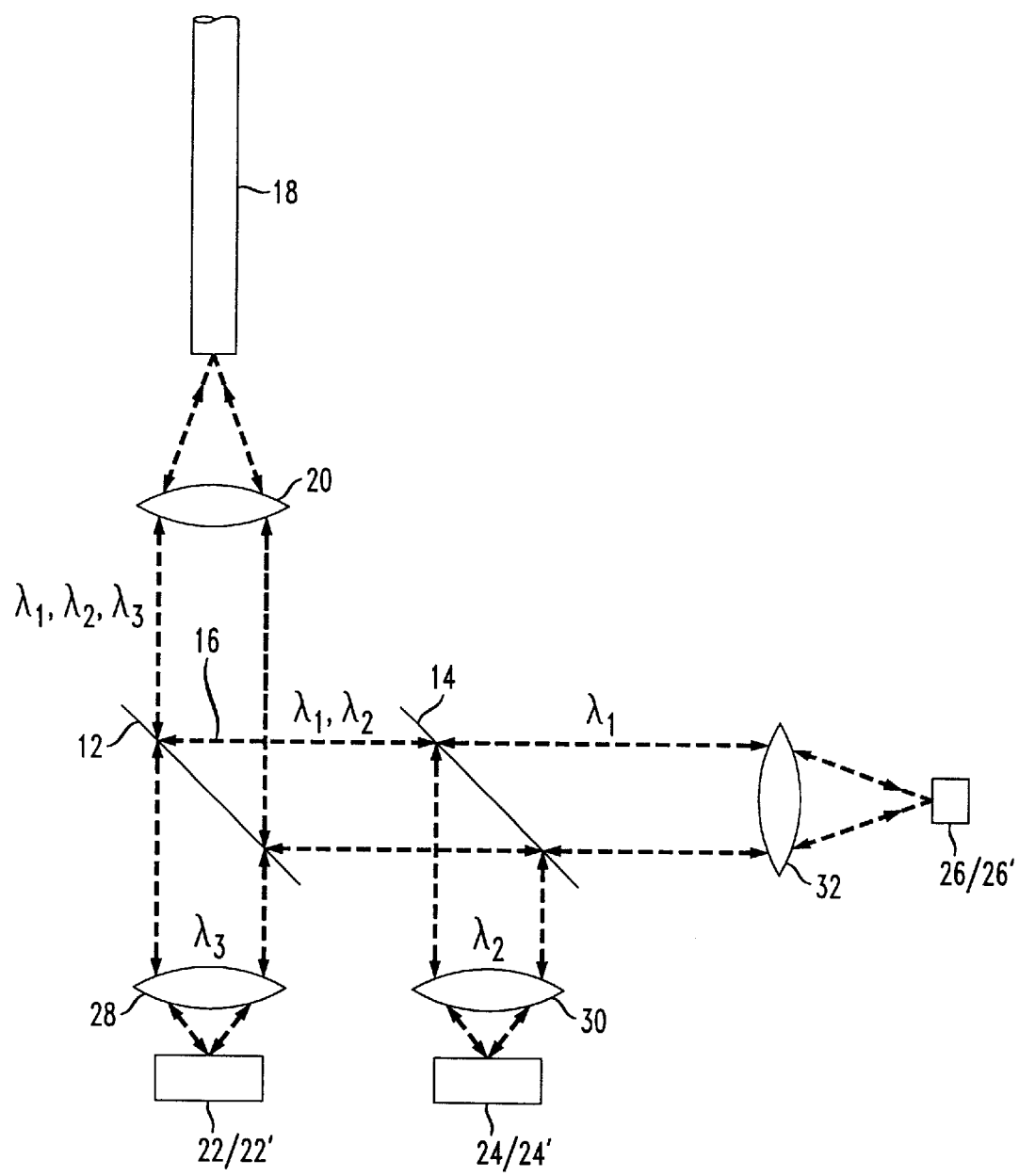
FIG. 3 schematically illustrates still another embodiment of a beam splitter/combiner module of the present invention.

The optical fiber 18 may also be oriented at an angle from the optical signal path 16. FIG. 3 illustratively depicts such an arrangement. In this embodiment, the optical fiber 18 and collimating lens 20 are oriented substantially perpendicular to the signal path 16. Furthermore, the first dichroic mirror 12 is constructed to reflect $\lambda_1$ and $\lambda_2$ and to transmit $\lambda_3$ therethrough, and the second dichroic mirror 14 is constructed to reflect $\lambda_2$ and to transmit $k$,. As shown, wavelength $\lambda_1$ emitted from source 26' is collimated by lens 32 and transmitted through the second dichroic mirror 14 along the optical signal path 16. Wavelength $\lambda_2$ emitted from source 24' is reflected by the second dichroic mirror 14 and combined with wavelength $\lambda_1$. Wavelength $\lambda_3$ emitted from the first signal source 22' is transmitted through the first dichroic mirror 12 and combined with wavelengths $\lambda_1$, and $\lambda_2$ reflecting from the first dichroic mirror 12. The combined beam having all three wavelengths is then converged by lens 20 onto the optical fiber end 18.

Alternatively, instead of sources 22', 24' and 26', detectors 22, 24 and 26 are employed for detecting signals emitted from the optical fiber end 18. Specifically, wavelengths $\lambda_1$ and $\lambda_2$ emitted from the optical fiber end 18 are reflected from the first dichroic mirror so as to travel along the optical signal path 16. Wavelength $\lambda_1$ is transmitted through dichroic mirror 14 and converged by lens 32 onto detector 26. Wavelength $\lambda_2$ is reflected by the second dichroic mirror 14 and converged by lens 30 onto detector 24. Wavelength $\lambda_3$ emitted from the optical signal fiber end 18 is transmitted through the first dichroic mirror 12 and converged by lens 28 onto detector 22.

Figure 4:
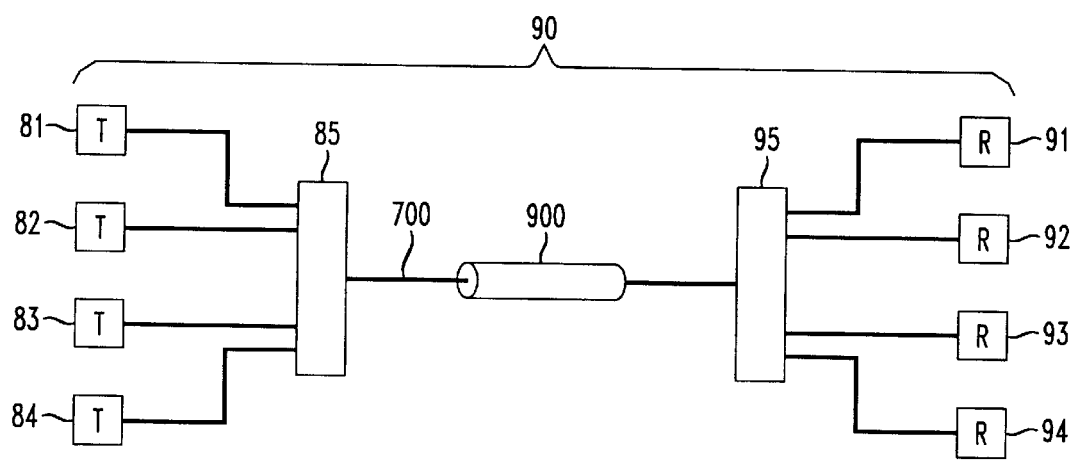
FIG. 4 diagrammatically depicts a wave-division-multiplex system constructed with the beam splitter/combiner module of the FIG. 1 embodiment.

FIG. 4 illustrates an arrangement by which the inventive beam splitter/combiner module can be advantageously employed in a wave-division-multiplex system 90 having an optical cable 900 of, for example, at least 10 kilometers in length. The cable 900 includes a special singlemode optical fiber 700 that is suitable for transmitting optical signals in the entire wavelength region 1200–1600 nm, and which has a loss at 1385 nm that is less than its loss at about 1310 nm. Optical fiber 700 enables the system 90 to operate in the 1385 nm window (i.e. 1360–1430 nm), a region which has not historically been used because of higher attenuation over much of this region in conventional fibers due to absorption by the OH bonds contained therein. Conventional singlemode systems thus operate only in either the 1310 nm window (i.e. 1280–1325 nm) or the 1550 nm window (i.e. 1530–1565 nm).

Preferably, the special optical fiber 700 is fabricated from a core rod that is overclad with a glass tube having suitably low OH content. The core rod has a preferred OH concentration level that is less than 0.8 parts per billion by weight, and a deposited cladding/core ratio D/d<7.5, wherein d is the diameter of the core and D is the diameter of the deposited cladding.

The system 90 includes four transmitters 81–84 that modulate four predetermined wavelengths in the 1200–1600 nm region with four different signals. At least one of the transmitters (e.g. transmitter 81) operates at a wavelength in the 1360–1430 nm region. The modulated wavelengths are combined using a beam combiner module 85 constructed in if) accordance with the present invention, as for example in the manner illustrated in FIGS. 1 and 2 and described above, and then transmitted through the optical cable 900. At the receiver end, the four channels are separated by a beam splitter module 95 of the present invention in accordance with their wavelengths and then processed by receivers 91–94 to extract the individual baseband signals. Although not shown in FIG. 3, optical amplifiers may also be included along the transmission path between beam combiner module 85 and beam splitter module 95.

While there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

I claim:

1. A beam splitter/combiner module operatively connectable to an optical fiber end and for at least one of multiplexing and demultiplexing a plurality of optical signals having at least three different wavelengths $\lambda_1$, $\lambda_2$, and $\lambda_3$ traveling through the module, comprising:

a first dichroic mirror constructed for one of low loss transmission and high reflectance of wavelengths including $\lambda_1$ and $\lambda_2$, and for another one of low loss transmission and high reflectance of wavelength $\lambda_3$;

a first collimating lens disposed between the optical fiber end and said first dichroic mirror for training signals between the optical fiber end and said first dichroic mirror;

a second collimating lens disposed for training a first portion of said plurality of signals which is reflected by said first dichroic mirror;

a second dichroic mirror disposed along an optical signal path defined between said first and said second dichroic mirrors for communicating optical signals along said signal path between said first dichroic mirror and said second dichroic mirror, said second dichroic mirror constructed for low loss transmission of wavelength $\lambda_1$ so as to substantially transmit the signal having wavelength $\lambda_1$ through said second dichroic mirror, and for high reflectance of wavelength $\lambda_2$ so as to substantially reflect the signal having wavelength $\lambda_2$;

a third collimating lens disposed for training a second portion of said plurality of signals reflected by said second dichroic mirror; and a fourth collimating lens disposed for training a third portion of said plurality of signals transmitted by said second dichroic mirror.

2. The beam splitter/combiner module of claim 1, wherein:

said first dichroic mirror is constructed for low loss transmission of wavelengths including $\lambda_1$ and $\lambda_2$ so as to substantially transmit the signals having wavelengths $\lambda_1$ and $\lambda_2$ therethrough, and for high reflectance of wavelength $\lambda_3$ so as to substantially reflect the signal having wavelength $\lambda_3$; and said second dichroic mirror is constructed for low loss transmission of wavelength $\lambda_1$ so as to substantially transmit the signal having wavelength $\lambda_1$ through said second dichroic mirror, and for high reflectance of wavelength $\lambda_2$ so as to substantially reflect the signal having wavelength $\lambda_2$.

3. The beam splitter/combiner module of claim 2, wherein said second dichroic mirror is oriented substantially parallel to said first dichroic mirror.

4. The beam splitter/combiner module of claim 2, wherein said first dichroic mirror is oriented so that the signal having wavelength $\lambda_3$ is received by said first mirror at an incident angle of about 45° to said first dichroic mirror.

5. The beam splitter/combiner module of claim 2, wherein said first dichroic mirror reflects the signal having wavelength $\lambda_3$ out of the optical signal path, and wherein said beam splitter/combiner module further comprises a first detector located for receiving the reflected signal from said first dichroic mirror.

6. The beam splitter/combiner module of claim 5, wherein said second dichroic mirror reflects the signal having wavelength $\lambda_2$ out of the optical signal path, and wherein the beam splitter/combiner module further comprises a second detector located for receiving the reflected signal from said second dichroic mirror.

7. The beam splitter/combiner module of claim 6, further comprising a third detector for receiving the signal having wavelength $\lambda_1$ after transmission of the signal through said second dichroic mirror.

8. The beam splitter/combiner module of claim 2, further comprising a first source located outside of the optical signal path and operable for emitting the signal having wavelength $\lambda_3$ to said first dichroic mirror for reflection of the signal having wavelength $\lambda_3$ by said first dichroic mirror into and along the optical signal path.

9. The beam splitter/combiner module of claim 8, further comprising a second source located outside of the optical signal path and operable for emitting the signal having wavelength $\lambda_2$ to said second dichroic mirror for reflection of the signal having wavelength $\lambda_2$ by said second dichroic mirror into and along the optical signal path.

10. The beam splitter/combiner module of claim 9, further comprising a third source operable for emitting the signal having wavelength $\lambda_1$ into the optical path for transmission through said first and said second dichroic mirrors.

11. The beam splitter/combiner module of claim 2, wherein at least one of the wavelengths $\lambda_1$, $\lambda_2$, and $\lambda_3$ has a value in the region 1360–1430 nm.

12. The beam splitter/combiner module of claim 7, wherein said first collimating lens is disposed between the optical fiber end and said first dichroic mirror for collimating signals emitted from the optical fiber end so as to direct the fiber end-emitted signals onto said first dichroic mirror, wherein said second collimating lens is disposed between said first dichroic mirror and said first detector for converging onto said first detector said first portion of said plurality of signals, said third collimating lens is disposed between said second dichroic mirror and said second detector for converging onto said second detector said second portion of said plurality of signals, and said fourth collimating lens is disposed between said second dichroic mirror and said third detector for converging onto said third detector said third portion of aid plurality of signals.

13. The beam splitter/combiner module of claim 10, wherein said first collimating lens is disposed between the first dichroic mirror and the optical fiber end for converging signs from said first dichroic mirror onto the optical fiber end, wherein said first portion of said plurality of signals is emitted by said first source and said second collimating lens is disposed between said first dichroic mirror and said first source for collimating said first portion of said plurality of signals, said second portion of said plurality of signals is emitted by said second source and said third collimating lens is disposed between said second dichroic mirror and said second detector for collimating said second portion of said plurality of signals, and said third portion of said plurality of signals is emitted by said third source and said fourth collimating lens is disposed between said second dichroic mirror and said third source for collimating said third portion of said plurality of signals.

14. The beam splitter/combiner module of claim 2, wherein said first dichroic mirror is constructed for low loss transmission over a first preselected range of wavelengths including $\lambda_1$ and $\lambda_2$ and further constructed for high reflectance over a second preselected range of wavelengths including $\lambda_3$, and said second dichroic mirror is constructed for low loss transmission over a third preselected range of wavelengths including $\lambda_1$ and further constructed for high reflectance over a fourth preselected range of wavelengths including $\lambda_2$.

15. The beam splitter/combiner module of claim 1, wherein:
said first dichroic mirror is constructed for high reflectance of wavelengths including $\lambda_1$ and $\lambda_2$ so as to substantially reflect the signals having wavelengths $\lambda_1$ and $\lambda_2$, and for low loss transmission of wavelength $\lambda_3$ so as to substantially transmit the signal having wavelength $\lambda_3$ through said first dichroic mirror; and
said second dichroic mirror is constructed for low loss transmission of wavelength $\lambda_1$ so as to substantially transmit the signal having wavelength $\lambda_2$, through said second dichroic mirror, and for high reflectance of wavelength $\lambda_2$ so as to substantially reflect the signal having wavelength $\lambda_2$.

16. The beam splitter/combiner module of claim 15, wherein said second dichroic mirror is oriented substantially parallel to said first dichroic mirror.

17. The beam splitter/combiner module of claim 15, wherein said first dichroic mirror is oriented so that the signals having wavelength $\lambda_1$ and $\lambda_2$ are received by said first mirror at an incident angle of about 45° to said first dichroic mirror.

18. The beam splitter/combiner module of claim 15, wherein said first dichroic mirror transmits the signal having wavelength $\lambda_3$, and wherein said beam splitter/combiner module further comprises a first detector located for receiving the signal having wavelength $\lambda_3$ transmitted through said first dichroic mirror.

19. The beam splitter/combiner module of claim 18, where in said second dichroic mirror reflects the signal having wavelength $\lambda_2$ out of the optical signal path, and wherein the beam splitter/combiner module further comprises a second detector located for receiving the reflected signal from said second dichroic mirror.

20. The beam splitter/combiner module of claim 19, further comprising a third detector for receiving the signal having wavelength $\lambda_1$ after transmission of the signal through said second dichroic mirror.

21. The beam splitter/combiner module of claim 15, further comprising a first source located outside of the optical signal path and operable for emitting the signal having wavelength $\lambda_3$ to said first dichroic mirror for transmitting the signal having wavelength $\lambda_3$ through said first dichroic mirror.

22. The beam splitter/combiner module of claim 21, further comprising a second source located outside of the optical signal path and operable for emitting the signal having wavelength $\lambda_2$ to said second dichroic mirror for reflection of the signal having wavelength $\lambda_2$ by said second dichroic mirror into and along the optical signal path.

23. The beam splitter/combiner module of claim 22, further comprising a third source operable for emitting the signal having wavelength $\lambda_1$ into the optical path for transmission through said first and said second dichroic mirrors.

24. The beam splitter/combiner module of claim 15, wherein at least one of the wavelengths $\lambda_1$, $\lambda_2$ and $\lambda_3$ has a value in the region 1360–1430 nm.

25. The beam splitter/combiner module of claim 20, wherein said first collimating lens is disposed between the optical fiber end and said first dichroic mirror fur collimating signals emitted from the optical fiber end so as to direct the fiber end-emitted signals onto said first dichroic mirror, wherein said second collimating lens is disposed between said first dichroic mirror and said first detector for converging onto said first detector said first portion of said plurality of signals, said third collimating lens is disposed between said second dichroic mirror and said second detector for converging onto said second detector said second portion of said plurality of signals, and said fourth collimating lens is disposed between said second dichroic mirror and said third detector for converging onto said third detector said third portion of said plurality of signals.

26. The beam splitter/combiner module of claim 23, wherein said first collimating lens is disposed between the first dichroic mirror and the optical fiber end for converging signals from said first dichroic mirror onto the optical fiber end, wherein said first portion of said plurality of signals is emitted by said first source and said second collimating lens is disposed between said first dichroic mirror and said first source for collimating said first portion of said plurality of signals, said second portion of said plurality of signals is emitted by said second source and said third collimating lens is disposed between said second dichroic mirror and said second detector for collimating said second portion of said plurality of signals, and said third portion of said plurality of signals is emitted by said third source and said fourth collimating lens is disposed between said second dichroic mirror and said third source for collimating said third portion of said plurality of signals.

27. The beam splitter/combiner module of claim 15, wherein said first dichroic mirror is constructed for high reflectance over a first preselected range of wavelengths including $\lambda_1$ and $\lambda_2$ and for low transmission over a second preselected range of wavelengths including $\lambda_3$, and said second dichroic mirror is constructed for low loss transmission over a third preselected range of wavelengths including $\lambda_1$ and for high reflectance over a fourth preselected range of wavelengths including $\lambda_2$.

* * * * *